(167.)
CHRISTIAN BURGER.
Clamp Joint.
No. 121,929.           Patented Dec. 19, 1871.
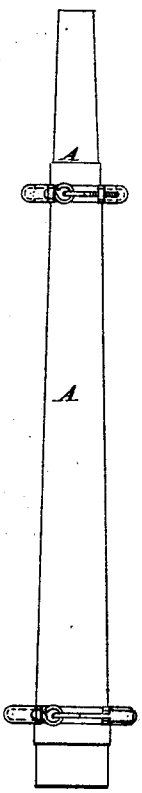
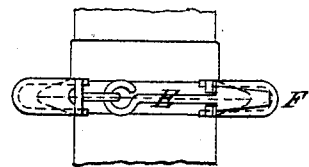
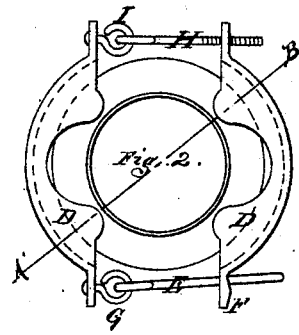
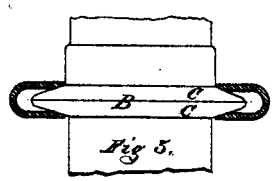
Section through A'-B'
INVENTOR,
Christian Burger
WITNESSES:
Daniel H. Wentzel
John Kaul

UNITED STATES PATENT OFFICE.

CHRISTIAN BURGER, OF READING, PENNSYLVANIA.

IMPROVEMENT IN PIPE-COUPLINGS.

Specification forming part of Letters Patent No. 121,929, dated December 19, 1871.

*To all whom it may concern:*

Be it known that I, CHRISTIAN BURGER, of Reading, Berks county, State of Pennsylvania, have invented an Improved Clamp-Joint, of which the following is a specification:

My invention relates to the connecting of pipes by means of a clamp placed around the flanges of the pipes in such a manner as to make the union perfectly secure and at the same time to render the attachment and detachment of the joint an easy, simple, and speedy operation; the object of my invention being to render the work of joining and disjoining pipes more easy and expeditious.

Figure 1 represents a view of the lock and latch. Fig. 2 represents cross-section of pipe at union, with clamp adjusted. Fig. 3 represents back view of joint. Fig. 4 represents two joints of pipe, with locks uppermost. Fig. 5 represents two joints of pipe on side opposite locks.

A A are two pieces of pipe attached to each other. B is the joint where the pieces come together. C is a beveled flange. D is a clamp fitting on beveled flanges to hold them together. E is the lock of clamp. F is the latch of clamp. G is the eye fastening lock to clamp. H is an eyebolt for tightening clamp. I is an eye fastening screw to clamp. The lock and latch are designed to be made of wrought-iron. All the other parts may be cast-iron.

When the pipes are used to conduct or contain water the gum or rubber is intended to be placed between the flanges to make the joint perfectly secure. When the pipes are not used for water then white or red lead, cement, or other packing may be used, according to the circumstances of the case.

I claim as my invention—

The clamps D, in combination with the screw H and connection E, when combined as shown, and for the purpose set forth.

CHRISTIAN BURGER.

Witnesses:
DANIEL H. WENTZEL,
JOHN KAUL.

(167)